United States Patent
Yano

(10) Patent No.: US 12,529,127 B2
(45) Date of Patent: Jan. 20, 2026

(54) CBN SINTERED BODY

(71) Applicant: MITSUBISHI MATERIALS CORPORATION, Tokyo (JP)

(72) Inventor: Masahiro Yano, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 348 days.

(21) Appl. No.: 18/263,306

(22) PCT Filed: Jan. 24, 2022

(86) PCT No.: PCT/JP2022/002412
§ 371 (c)(1),
(2) Date: Jul. 27, 2023

(87) PCT Pub. No.: WO2022/168655
PCT Pub. Date: Aug. 11, 2022

(65) Prior Publication Data
US 2024/0318286 A1    Sep. 26, 2024

(30) Foreign Application Priority Data

Feb. 2, 2021 (JP) ................................. 2021-014845

(51) Int. Cl.
*C22C 29/16* (2006.01)
*C04B 35/5831* (2006.01)
(Continued)

(52) U.S. Cl.
CPC ............ *C22C 29/16* (2013.01); *C22C 29/005* (2013.01); *C04B 35/5831* (2013.01);
(Continued)

(58) Field of Classification Search
CPC .............. C22C 26/00; C22C 2026/005; C22C 2026/007; C22C 2026/008;
(Continued)

(56) References Cited

U.S. PATENT DOCUMENTS 4,343,651 A    8/1982   Yazu et al.
4,788,166 A   11/1988   Araki et al.
(Continued)

FOREIGN PATENT DOCUMENTS

DE    69903242 T2    9/2003
EP    1074530 A2    2/2001
(Continued)

OTHER PUBLICATIONS

International Search Report mailed Mar. 29, 2022 for the corresponding PCT International Patent Application No. PCT/JP2022/002412 (5 pages including English Translation).
Japanese Office Action dated Sep. 3, 2025 for the corresponding Japanese Patent Application No. 2022-579450; 10 pages including English translation.

*Primary Examiner* — Adil A. Siddiqui
(74) *Attorney, Agent, or Firm* — Leason Ellis LLP; Melvin C. Garner; Mitsuhiro Haraguchi

(57) ABSTRACT

A cBN sintered compact comprises: cubic boron nitride grains and a binder phase, wherein
1) the binder phase comprises a Ti—Al alloy containing at least one element selected from the group consisting of Si, Mg, and Zn, and further comprises $Ti_2CN$ and $TiB_2$;
2) the ratio $I_{Ti2CN}/I_{Ti-Al}$ in XRD is 2.0 or more and 30.0 or less where $I_{Ti2CN}$ represents the peak intensity of $Ti_2CN$ appearing at 2θ angle from 41.9° to 42.2° and $I_{Ti-Al}$ represents the peak intensity of the Ti—Al alloy at 2θ angle from 39.0° to 39.3°;
3) areas where Ti and B elements overlap have an average aspect ratio of 1.7 or more and 6.5 or less and an area rate of 0.025% or more and 0.120% or less, in a mapping image of the Ti and B elements by Auger electron spectroscopy.

1 Claim, 1 Drawing Sheet

(51) Int. Cl.
*C22C 26/00* (2006.01)
*C22C 29/00* (2006.01)

(52) U.S. Cl.
CPC ............... *C04B 2235/3843* (2013.01); *C04B 2235/3852* (2013.01); *C04B 2235/3856* (2013.01); *C22C 2026/003* (2013.01)

(58) Field of Classification Search
CPC . C22C 2026/003; C22C 29/16; C22C 29/005; C22C 1/051; B22F 2005/001; C04B 2235/3206; C04B 2235/3284; C04B 2235/3418; C04B 2235/3445; C04B 2235/3843; C04B 2235/3856; C04B 2235/386; C04B 2235/3873; C04B 2235/3886; C04B 2235/402; C04B 2235/404; C04B 2235/5436; C04B 2235/661; C04B 2235/785; C04B 2235/786; C04B 2235/80; C04B 35/6303; C04B 35/6316; C04B 35/645; C04B 35/5831; C04B 2235/3817; C04B 2235/3852; C04B 2235/3865; C04B 2235/604

See application file for complete search history.

(56) References Cited

U.S. PATENT DOCUMENTS

| | | |
|---|---|---|
| 6,001,757 A | 12/1999 | Fukaya et al. |
| 6,265,337 B1 | 7/2001 | Kukino et al. |
| 2007/0032369 A1 | 2/2007 | Franzen |
| 2012/0055099 A1 | 3/2012 | Bao et al. |
| 2013/0298475 A1 | 11/2013 | Bao et al. |
| 2016/0194254 A1* | 7/2016 | Tsukihara ......... C04B 35/58014 51/307 |
| 2017/0101346 A1 | 4/2017 | Yumoto et al. |
| 2022/0289633 A1* | 9/2022 | Okamura .............. C04B 35/645 |

FOREIGN PATENT DOCUMENTS

| | | |
|---|---|---|
| EP | 1074530 A3 | 2/2001 |
| JP | 56156738 A | 12/1981 |
| JP | 61146763 A | 7/1986 |
| JP | 5310474 A | 11/1993 |
| JP | 7172919 A | 11/1995 |
| JP | 10114575 A | 5/1998 |
| JP | 2008517868 A | 5/2008 |
| JP | 2013537116 A | 9/2013 |
| JP | 5804448 B2 | 11/2015 |
| JP | 2019077576 A | 5/2019 |

* cited by examiner

CBN SINTERED BODY

CROSS-REFERENCE TO RELATED PATENT APPLICATIONS

This application is a U.S. National Phase Application under 35 U.S.C. § 371 of International Patent Application No. PCT/JP2022/002412 filed on Jan. 24, 2022 and claims the benefit of priority to Japanese Patent Application No. 2021-014845 filed on Feb. 2, 2021, the contents of all of which are incorporated herein by reference in their entireties. The International Application was published in Japanese on Aug. 11, 2022 as International Publication No. WO/2022/168655 under PCT Article 21(2).

FIELD OF THE INVENTION

The present invention relates to a cubic boron nitride sintered compact (hereinafter also may be referred to as a cBN sintered compact), which is a hard composite material.

BACKGROUND OF THE INVENTION cBN sintered compacts, which are inferior in hardness to diamond, have been used in cutting tools because of low reactivity with Fe-based and Ni-based materials, and have also been used in drilling tips for drilling tools.

Drilling tools are tools used for digging in the ground or rocks. Underground rocks are brittle materials with non-uniformity compositions and strength. Unlike cutting processes, which focus on the performance of cutting and scraping, drilling tools must withstand impacts and vibrations to break rocks, and the rotation to efficiently remove the broken rock pieces. Under these circumstances, several proposals have been made to improve the cutting performance and drilling performance of cemented carbide and cBN sintered compact.

For example, Japanese Patent No. 5804448 discloses a cBN sintered compact that comprises a binder phase containing 45 to 75% by volume of cubic boron nitride grains with an average size of 0.5 to 3.5 μm and titanium boride grains with an average size of 50 to 500 nm dispersed therein, wherein the expression holds: $(-0.05X+4.5) \leq Y \leq (-0.2X+18)$ between the content X (% by volume) of the cubic boron nitride grains and the content Y (% by volume) of the formed titanium boride grains, and the proportion of the titanium boride grains not in contact with the cubic boron nitride grains is 15 to 65% by volume of all the titanium boride grains. This cBN sintered compact has excellent toughness and excellent chipping and wear resistance when used in cutting tools.

Japanese Unexamined Patent Application Publication No. Hei 5-310474 discloses a cBN sintered compact that comprises a hard phase comprising 25 to 90% by volume of cubic boron nitride and/or wurtzite boron nitride, and a binder phase being the balance mainly composed of ceramics, where the grains of the hard phase each have a surface including a first layer containing at least one selected from the group consisting of titanium-containing boronitride, borocarbide, boroxide, boronitrooxide, boronitrocarbide, borocarboxide, and boronitrocarboxide, and a second layer over the entire surface of the first layer, the second layer containing at least one selected from the group consisting of aluminum-containing boronitride, borocarbide, boroxide, boronitrooxide, boronitrocarbide, borocarboxide, and boronitrocarbooide. The cBN sintered compact has excellent chipping resistance.

Japanese Unexamined Patent Application Publication No. 2013-537116 discloses a self-sintered polycrystalline cubic boron nitride compact containing a first phase of cBN grains and a ceramic binder phase of a titanium compound, the first phase accounting for more than 80% by volume of the compact. The binder phase is formed of a $Ti_2AlC$ precursor and has conductivity or semiconductivity. As a result, the cBN sintered compact has excellent workability in electric discharge and is suitable for cutting of cast iron and cemented carbide.

CITATION LIES

Patent Literature

[PTL 1] Japanese Patent No. 5804448
[PTL 2] Japanese Unexamined Patent Application Publication No. Hei 5-310474
[PTL 3] Japanese Unexamined Patent Application Publication No. 2013-537116

Technical Problem

The present invention was made in view of the aforementioned circumstances and disclosures. The objective of the present invention is to provide a cBN sintered compact that is a hard composite material having excellent fatigue wear resistance and abrasive wear resistance, and also having resistance to damage such as fracture due to impact and vibration applied to destroy a rock, even when the hard composite material is used as a drilling tool.

SUMMARY OF THE INVENTION

Solution to Problem

A cBN sintered compact in accordance with an embodiment of the present invention comprising:
1) cubic boron nitride grains and a binder phase, wherein
2) the binder phase comprises a Ti—Al alloy, $Ti_2CN$ and $TiB_2$, while the Ti—Al alloy containing at least one element selected from the group consisting of Si, Mg, and Zn;
3) the ratio $I_{Ti2CN}/I^{Ti-Al}$ in XRD is 2.0 or more and 30.0 or less where $I_{Ti2CN}$ represents the peak intensity of $Ti_2CN$ appearing at 2θ from 41.9° to 42.2° and $I_{Ti-Al}$ represents the peak intensity of the Ti—Al alloy at 2θ from 39.0° to 39.3°;
4) areas where Ti and B elements overlap have an average aspect ratio of 1.7 or more and 6.5 or less and an area rate of 0.025% or more and 0.120% or less, in a mapping image of the Ti and B elements by Auger electron spectroscopy.

Advantageous Effects of Invention

The cBN sintered compact is excellent in fatigue wear resistance and abrasive wear resistance, and has resistance to damage factors such as fracture due to impacts and vibrations for breaking rocks in use as a drilling tool.

DETAILED DESCRIPTION OF THE INVENTION

Figure 1:
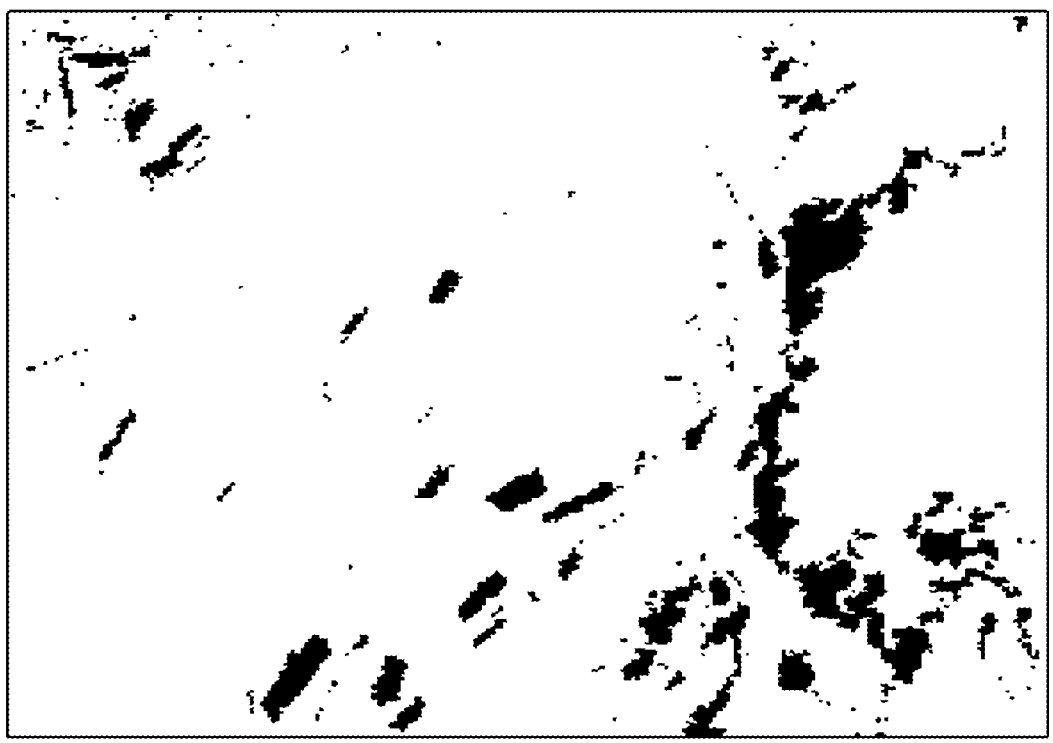
FIG. 1 is a schematic diagram illustrating overlapping portions of Ti elements and B elements based on elemental mapping by Auger electron spectroscopy in Example 14.

The present inventor has investigated to obtain a cBN sintered compact that exhibits excellent fatigue wear resistance and abrasive wear resistance, and has resistance to damage factors, such as fractures due to impacts and vibrations for breaking rocks in use as a drilling tool.

As a result, the inventor has discovered that a sintered compact exhibits excellent fatigue wear resistance and abrasive wear resistance, and has resistant to damage factors, such as fractures due to impacts and vibrations for breaking rocks in use as a drilling tool under the following conditions: a certain relationship holds between XRD peaks of the $Ti_2CN$ and the Ti—Al alloy contained in the binder phase; and areas where Ti elements and B elements overlap have an average aspect ratio within a certain range and an area rate within a certain range.

The following detailed description will focus on application of the cBN compact in accordance with embodiments of the present invention to drilling tools.

The expression "A to B" or "A-B" (A and B are both numerical values) on the numerical range throughout the specification and claims is synonymous with "A or above and B or below", and the range includes the upper limit value (B) and the lower limit value (A). In the case that only the upper limit (B) is followed by a unit, the unit for the upper limit (B) should also be applied to the lower limit (A).

1. Cubic Boron Nitride (cBN) Grains

The average size of cBN grains and the content of cBN grains in the cBN sintered compact will now be described.

(1) Mean Grain Size

The cBN grains used in this embodiment may have any mean grain size. The preferred mean grain size ranges from 0.5 to 30.0 µm.

The reason for limiting the range of the mean grain size is as follows: In addition to an improvement in fracture resistance by hard cBN grains contained in the sintered compact, a mean grain diameter of 0.5 to 30.0 µm leads to, for example, not only suppressing in breakage and chipping originating from the uneven shape of the cutting edge caused by detachment of cBN grains from the surface of a drilling tool during use, but also suppressing in cracks propagating from the interface between the cBN grains and the binder phase by stresses applied to the cutting edge of the drilling tool during use or suppressing in propagation of cracking of the cBN grains.

The mean diameter of cBN grains can be determined as follows: The cross section of a sintered cBN is mirror-finished, and the microstructure on the mirror-finished surface is observed by scanning electron microscopy (SEM) to capture a secondary electron image. A portion of cBN grains in the captured image is extracted by image processing, and the mean grain diameter (described below) is calculated based on the maximum length of each grain determined by image analysis.

The extraction of the portions of cBN grains in the image by the image processing comprises the steps of: displaying the image in monochrome of 256 gradations including 0 in black and 255 in white to clearly distinguish the cBN grains from the binder phase; and binarizing the image using a threshold calculated with an expression $(w-v)/2+v$ where v represents the peak pixel value of each portion of cBN grains and w represents the peak pixel value of each portion of the binder phases.

It is preferable to determine pixel values of at least three different cBN grains within the same image area and to define the average of the three pixel values as the peak pixel value of the cBN grain. The region for determining the pixel values of each cBN grain has dimensions of, for example, about 0.5 µm by 0.5 µm. It is preferable to determine pixel values of at least three different binder-phases within the same image area and to define the average of the three pixel values as the peak value of the binder phase. The region for determining the pixel values of each binder phase has dimensions of about 0.2 µm by 0.2 µm to 0.5 µm by 0.5 µm.

After the binarization process, the cBN grains are separated from each other by a process that separates the contact portions of the cBN grains, for example, by watershed analysis.

The black portions corresponding to cBN grains in the image after the binarization process are subjected to grain analysis, and the maximum length of each cBN grain is defined as a diameter of the cBN grain. For grain analysis to determine the maximum length, a larger one of the two lengths obtained by calculating the Feret diameter of one cBN grain is a maximum length, and this value is defined as a diameter of each cBN grain.

Each cBN grain is then assumed to be an ideal sphere with this diameter, to calculate the cumulative volume as a volume of the grain. Based on this cumulative volume, a graph is drawn with the vertical axis as volume percentage (%) and the horizontal axis as diameter (µm). The diameter at 50% volume fraction corresponds to the mean diameter of cBN grains. This treatment is performed for three observation areas, and the mean thereof is defined as a mean grain diameter D50 of cBN (µm).

Prior to the grain analysis, a length (µm) per pixel is preliminarily determined with a standard scale in a SEM image. Preferably, at least 30 cBN grains are observed in an observation area. For example, in the case that the average size of the cBN grains is about 3 µm, the observation area is preferably about 15 µm by 15 µm.

(2) Content

The cBN sintered compact may contain cBN grains in any content (% by volume). In preferred embodiments, the content is within the range between 65% or more and 93.0% or less by volume.

A content below 65.0% by volume leads to a reduced amount of hard material (cBN grains) in the cBN sintered compact, which may result in reduced fracture resistance in use, for example, as a drilling tool. A content above 93.0% by volume leads to formation of voids in the cBN sintered compact, which voids may work as origins of cracks and thus may result in reduced fracture resistance.

The content of the cBN grains in the cBN sintered compact can be determined as follows: A cross-sectional microstructure of the cBN sintered compact is observed by SEM, the portions of cBN grains in the observed secondary electron image are extracted by image processing, and then the area occupied by the cBN grains is calculated by image analysis. This procedure is repeated in at least three observation regions, and the average of the resulting areas is defined as a cBN grain content (% by volume). Preferably, at least 30 cBN grains are observed in an observation area. For example, in the case that the average size of the cBN grains is about 3 µm, the observation area is preferably about 15 µm by 15 µm.

2. Binder Phase

The binder phase preferably contains $Ti_2CN$ and $TiB_2$, in addition to a Ti—Al alloy containing at least one element selected from the group consisting of Si, Mg, and Zn. The term "at least one element" refers to any one, any two, or all three elements of the Si, Mg, and Zn elements.

It is preferable that the XRD peak intensities of $Ti_2CN$ and the Ti—Al alloy contained in the binder phase have a predetermined relation. Specifically, the ratio $I_{Ti2CN}/I_{TiAl}$ of the peak intensities is preferably 2.0 or more and 30.0 or less where $I_{Ti2CN}$ represents the intensity of the $Ti_2CN$ peak appearing at 2θ of 41.9° to 42.2° in XRD and $I_{TiAl}$ represents the intensity of the Ti—Al alloy peak appearing at 2θ of 39.0° to 39.3°. At a ratio of peak intensities within this range, the resulting cBN sintered compact has excellent wear resistance and abrasive wear resistance, and is highly resistant to damage factors such as chipping due to impact and vibration during rock excavation, for the following reasons.

At a ratio $I_{Ti2CN}/I_{TiAl}$ of less than 2.0, an excess amount of Ti—Al alloy present in the cBN sintered compact causes cBN grains to react with the Ti—Al alloy to form coarse $TiB_2$ and causes an excess amount of AlN to be formed. The $TiB_2$ and AlN work as starting points for fracture during rock excavation, for example. At a ratio $I_{Ti2CN}/I_{TiAl}$ of greater than 30.0, the content of Ti—Al alloy in the cBN sintered compact decreases, resulting in reductions in adhesion between the cBN grains and the binder phase and toughness of the cBN sintered compact.

The peak intensity $I_{Ti2CN}$ of $Ti_2CN$ and the peak intensity $I_{TiAl}$ of the Ti—Al alloy were determined by XRD using CuKα rays, where the peak of the 111 diffraction line of cBN at 2θ=43.3 is defined as a standard peak, the peak between 41.9° and 42.2° at 2θ angle is defined as $Ti_2CN$, and the peak between 39.0° and 39.3° at 2θ angle is defined as Ti—Al alloy. After background noise removal, these peaks are confirmed through peak search.

A mapping image of Ti and B elements by Auger Electron Spectroscopy (AES) includes areas where Ti elements and B elements overlap. It is preferred that the overlapping areas each have an aspect ratio of 1.7 or more and 6.5 or less and an area ratio of 0.025% or more and 0.120% or less, in a mapping image of the Ti and B elements. FIG. 1 illustrates the observed results of the sintered compact of Example 14, which will be described later, as example overlapping areas.

Figure 2:
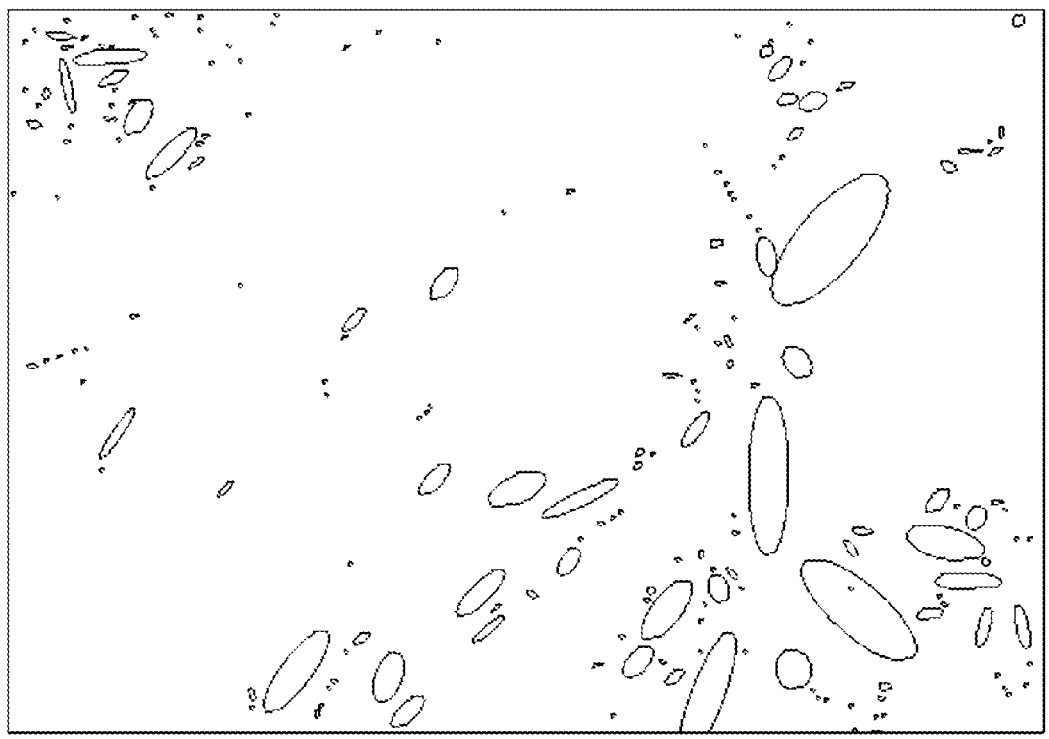
FIG. 2 illustrates elliptical approximation of the overlapping portions in FIG. 1.

The aspect ratio is defined by approximation to ellipses as shown in FIG. 2 of the overlapping areas shown in FIG. 1 by image analysis and averaging the aspect ratios (average ratio of long sides to short sides) of the ellipses, with proviso that overlapping areas having perfect circles with a circularity of 1 are excluded. The average aspect ratio is preferably 1.7 or more and 6.5 or less.

The circularity is defined by 4π×(area)/(perimeter squared), and a perfect circle has a circularity of 1.

The area rate represents the rate of the sum of the overlapping areas other than the areas of regular circles with a circularity of 1 to all the observed areas by the AES, and should preferably be between 0.025% and 0.120% or less for the following reasons:

An average aspect ratio of less than 1.7 cannot sufficiently inhibit the propagation of cracks generated in the cBN sintered compact resulting in an insufficient improvement in the toughness of the cBN sintered compact. An average aspect ratio of greater than 6.5 causes cracks generated in the cBN sintered compact to propagate within the overlapping areas, resulting in an insufficient improvement in the toughness of the cBN sintered compact.

Regarding the area rate of the overlapped area of the Ti and B elements, an area rate of less than 0.025%, regardless of an average aspect ratio within the range of 1.7 to 6.5, cannot sufficiently inhibit the propagation of cracks generated in the cBN sintered compact resulting in an insufficient improvement in the toughness of the cBN sintered compact. An area rate exceeding 0.120% causes the overlapped areas to inhibit the propagation of cracks with high probability, but readily causes the overlapped areas to works as the origins of cracks, in other words, of fatigue fracture.

To calculate the average aspect ratio and area ratio by image analysis, at least three sites in the sintered compact are observed and processed. The observed values at these sites are averaged to determine the average aspect ratio and area ratio. The observation area is preferably about 5.0 µm by 3.5 µm for an average diameter of 3 µm of the cBN grains.

The above description includes the features appended below.

APPENDIX 1

A cBN sintered compact comprising: cubic boron nitride grains and a binder phase, wherein
1) the binder phase comprises a Ti—Al alloy containing at least one element selected from the group consisting of Si, Mg, and Zn, and further comprises $Ti_2CN$ and $TiB_2$;
2) the ratio $I_{Ti2CN}/I_{Ti—Al}$ in XRD is 2.0 or more and 30.0 or less where $I_{Ti2CN}$ represents the peak intensity of $Ti_2CN$ appearing at 2θ from 41.9° to 42.2° and $I_{Ti—Al}$ represents the peak intensity of the Ti—Al alloy at 2θ from 39.0° to 39.3°;
3) areas where Ti and B elements overlap have an average aspect ratio of 1.7 or more and 6.5 or less and an area rate of 0.025% or more and 0.120% or less, in a mapping image of the Ti and B elements by Auger electron spectroscopy.

APPENDIX 2

The cBN sintered compact described in Appendix 1, wherein the cubic boron nitride crystal grains have an average grain size of 0.5 µm or more and 30.0 µm or less.

APPENDIX 3

The cBN sintered compact described in Appendix 1 or 2, wherein the content of the cubic boron nitride crystal grains is 65% by volume or more and 93.0% by volume or less.

Examples

Example will now be described; however, the invention should not be construed to limit in any way to these examples applied to tools for cutting rocks.

Example tools were produced by Procedures (1) to (3). The raw powders contained trace amounts of inevitable impurities.

(1) Preparation of Raw Powder

Hard material, i.e., cBN raw material that had a mean particle size of 0.5 to 35.0 µm after sintering as shown in Table 2, and binder phase material, $Ti_2AlC$ and $Ti_3AlC_2$ were prepared. Both $Ti_2AlC$ and $Ti_3AlC_2$ raw powder had a mean particle size of 50 µm.

TiN powder (0.6), TiCN powder (0.6), TiC powder (0.6), TiAl₃ powder (0.4), SiO₂ powder (0.02), ZnO powder (0.8), and MgO powder (0.8) were also prepared as raw powders for formation of the binder phase. The composition of these raw materials is shown in Table 1, where the number in parentheses after the name of each powder is the average particle diameter (D50), in μm.

(2) Mixing and Presintering Treatment

A ball mill vessel lined with cemented carbide was filled with the prepared powders other than powders containing Si, Mg, or Zn, cemented carbide balls, and acetone, followed by mixing. The mixing time was 1 hr to avoid fine pulverization of the raw powders. It is more preferable to use an ultrasonic agitation device to disintegrate the agglomeration of the raw material powders during mixing, although not used in this example.

The mixed raw powder was then presintering under a vacuum atmosphere of 1 Pa or less at a "Heat treatment temperature after mixing" shown in Table 2 as to evaporate water adsorbed on the powder surface.

The presintering temperature preferably ranges from 250° C. to 900° C. under a vacuum atmosphere of 1 Pa or less for the following reasons: A temperature of less than 250° C. causes insufficient evaporation of adsorbed water and Ti$_2$AlC and Ti$_3$AlC$_2$ to react with residual moisture to be decomposed into TiO$_2$ and Al$_2$O$_3$ during ultrahigh-pressure high-temperature sintering. A temperature exceeding 900° C. causes Ti$_2$AlC and Ti$_3$AlC$_2$ to react with oxygen to be also decomposed into TiO$_2$ and Al$_2$O$_3$ during presintering, resulting in a decrease in the content of Ti$_2$AlC and Ti$_3$AlC$_2$ in the binder phase and a decrease in the toughness of the sintered cBN compact.

A ball mill vessel lined with cemented carbide was filled with powders that did not contain Si, Mg, or Zn elements and had undergone presintering, one or more of the SiO$_2$, ZnO, and MgO powders, cemented carbide balls, and acetone. The mixing time was one hour to avoid fine pulverization of the raw powders. It is more preferable to use an ultrasonic agitation device to disintegrate the agglomeration of the raw powder during mixing, although not used in this example.

(3) Compaction and Sintering

Green compacts were produced with the resulting sinter raw material powders, were placed into an ultra-high pressure high-temperature sintering device, and were sintered at a pressure of 5 GPa and a temperature of 1600° C., to yield inventive cBN sintered compacts (example sintered compacts) 1- to 20 shown in Table 2. Each value in Table 2 was measured by the method described above. The average size and content of the cBN grains were determined in an observation area containing at least 30 cBN grains. The other parameters were determined in the observation area described above.

Comparative sintered compacts were also produced for comparison. As raw material for hard material, i.e., cBN raw material that had a mean particle size of 1.0 to 4.0 μm after sintering as shown in Table 4, and binder phase material, Ti$_2$AlC or Ti$_3$AlC$_2$ were prepared. Both Ti$_2$AlC and Ti$_3$AlC$_2$ raw powder had a mean particle size (D50) of 50 μm (the other powders had the same average particle size as that in Examples). These materials were mixed with other powders shown in Tables 1 and 3, except for SiO$_2$ powder, as in Examples, in a ball mill. Each mixture was presintered at a temperature ("Heat treatment temperature after mixing" in Table 4) in the range of 100° C. to 1200° C. under a vacuum atmosphere of 1 Pa or less, and then was mixed with SiO$_2$ powder in an amount shown in Tables 1 and 3 under the same condition shown in Examples. The mixture was molded to prepare a green compact. The green compact was placed into an ultra-high pressure high-temperature sintering device, and was sintered at a pressure of 5 GPa and a temperature of 1600° C., to yield comparative cBN sintered compacts (comparative example sintered compacts) 1- to 8 shown in Table 4. Each parameter shown in Table 4 was determined as in Examples.

TABLE 1

| | | Composition (% by volume) | | | | | | | | | |
|---|---|---|---|---|---|---|---|---|---|---|---|
| Type | | Ti$_2$AlC (Average grain size: 5 μm) | Ti$_2$AlC (Average grain size: 50 μm) | Ti$_3$AlC$_2$ (Average grain size: 5 μm) | Ti$_3$AlC$_2$ (Average grain size: 50 μm) | TiN | TiCN | TiC | TiAl$_3$ | SiO$_2$ | ZnO | MgO |
| Raw | a | — | — | 5 | 95 | — | — | — | — | — | — | — |
| material | b | — | — | 30 | 68 | — | — | — | — | 2 | — | — |
| of | c | — | — | 6 | 70 | 4 | — | 16 | — | 4 | — | — |
| binder | d | — | — | 17 | 42 | 8 | 30 | — | — | — | — | 3 |
| phae | e | 4 | 71 | 0 | 20 | — | — | — | — | 5 | — | — |
| for | f | 5 | 95 | — | — | — | — | — | — | — | — | — |
| Example* | g | 24 | 52 | — | — | 20 | — | — | — | 4 | — | — |
| | h | 2 | 74 | — | — | — | — | — | 20 | 4 | — | — |
| | i | 2 | 54 | — | — | 15 | — | 15 | — | 5 | 5 | — |
| | j | 30 | 45 | — | — | — | 20 | — | 5 | — | — | — |
| | k | 2 | 58 | — | — | — | 38 | — | — | 2 | — | — |
| | l | 22 | 38 | — | — | — | 38 | — | — | — | — | 2 |

In Table 1, the symbol "—" indicates that it is not compounded, and the symbol "*" indicates that some of the binder phase materials were also used in comparative examples.

TABLE 2

| Type | | cBN Content (% by volume) | cBN Average grain size (μm) | Material for binder phase | Heat treatment temperature after mixing (° C.) | Ratio of peak intensities by XRD [$I_{Ti2CN}/I_{Ti-Al}$] | Area rate (%) | Average aspect ratio of overlapping Ti and B elements | Composition of sintered compact (identified by XRD) |
|---|---|---|---|---|---|---|---|---|---|
| Sintered compact of example | 1 | 71.2 | 30.0 | e | 600 | 11.6 | 0.080 | 2.5 | cBN, Ti$_2$CN, TiB$_2$, TiAl$_3$, AlN (Al$_2$O$_3$ peak not found*) |
| | 2 | 75.6 | 3.7 | d | 600 | 10.1 | 0.037 | 6.2 | cBN, Ti$_2$CN, TiB$_2$, TiAl$_3$, AlN (Al$_2$O$_3$ peak not found*) |
| | 3 | 72.1 | 20.9 | a | 800 | 9.3 | 0.120 | 2.7 | cBN, Ti$_2$CN, TiB$_2$, TiAl$_3$, AlN (Al$_2$O$_3$ peak not found*) |
| | 4 | 73.4 | 7.9 | g | 600 | 19.2 | 0.061 | 5.2 | cBN, Ti$_2$CN, TiC, TiB$_2$, TiAl$_3$, Al$_2$O$_3$, AlN |
| | 5 | 74.2 | 2.5 | h | 600 | 6.1 | 0.090 | 1.9 | cBN, Ti$_2$CN, TiB$_2$, TiAl$_3$, Al$_2$O$_3$, AlN |
| | 6 | 76.1 | 3.9 | i | 600 | 13.1 | 0.037 | 1.9 | cBN, Ti$_2$CN, TiB$_2$, TiAl$_3$, Al$_2$O$_3$, AlN |
| | 7 | 91.5 | 2.2 | f | 600 | 10.6 | 0.059 | 2.6 | cBN, Ti$_2$CN, TiB$_2$, TiAl$_3$, Al$_2$O$_3$, AlN |
| | 8 | 75.0 | 2.3 | j | 600 | 14.1 | 0.105 | 6.5 | cBN, Ti$_2$CN, TiB$_2$, TiAl$_3$, Al$_2$O$_3$, AlN |
| | 9 | 73.4 | 2.8 | e | 600 | 11.1 | 0.089 | 2.3 | cBN, Ti$_2$CN, TiB$_2$, TiAl$_3$, AlN (Al$_2$O$_3$ peak not found*) |
| | 10 | 75.9 | 2.4 | f | 600 | 10.7 | 0.077 | 2.4 | cBN, Ti$_2$CN, TiB$_2$, TiAl$_3$, Al$_2$O$_3$, AlN |
| | 11 | 75.0 | 2.8 | k | 600 | 25.5 | 0.034 | 2.5 | cBN, Ti$_2$CN, TiB$_2$, TiAl$_3$, Al$_2$O$_3$, AlN |
| | 12 | 75.4 | 2.7 | l | 400 | 30.0 | 0.025 | 6.0 | cBN, Ti$_2$CN, TiB$_2$, TiAl$_3$, Al$_2$O$_3$, AlN |
| | 13 | 75.6 | 3.2 | h | 250 | 2.0 | 0.094 | 1.7 | cBN, Ti$_2$CN, TiB$_2$, TiAl$_3$, Al$_2$O$_3$, AlN |
| | 14 | 74.1 | 14.7 | f | 900 | 9.9 | 0.081 | 2.6 | cBN, Ti$_2$CN, TiB$_2$, TiAl$_3$, Al$_2$O$_3$, AlN |
| | 15 | 74.5 | 4.2 | b | 800 | 8.9 | 0.119 | 6.4 | cBN, Ti$_2$CN, TiB$_2$, TiAl$_3$, AlN (Al$_2$O$_3$ peak not found*) |
| | 16 | 69.7 | 1.4 | h | 300 | 3.3 | 0.108 | 1.8 | cBN, Ti$_2$CN, TiB$_2$, TiAl$_3$, Al$_2$O$_3$, AlN |
| | 17 | 86.4 | 2.9 | f | 600 | 9.8 | 0.064 | 2.6 | cBN, Ti$_2$CN, TiB$_2$, TiAl$_3$, Al$_2$O$_3$, AlN |
| | 18 | 75.7 | 2.8 | a | 600 | 11.1 | 0.116 | 2.9 | cBN, Ti$_2$CN, TiB$_2$, TiAl$_3$, AlN (Al$_2$O$_3$ peak not found*) |
| | 19 | 74.3 | 0.5 | c | 800 | 13.2 | 0.062 | 3.6 | cBN, Ti$_2$CN, TiB$_2$, TiAl$_3$, AlN (Al$_2$O$_3$ peak not found*) |
| | 20 | 73.9 | 2.5 | l | 900 | 22.2 | 0.030 | 5.9 | cBN, Ti$_2$CN, TiB$_2$, TiAl$_3$, Al$_2$O$_3$, AlN |

In Table 2, the symbol "*" indicates that the Al$_2$O$_3$ was observed by electron probe micro analyzer (EPMA).

TABLE 3

| Type | | Composition (% by volume) | | | | | | |
|---|---|---|---|---|---|---|---|---|
| | | Ti$_2$AlC (Average grain size: 5 μm) | Ti$_2$AlC (Average grain size: 50 μm) | Ti$_3$AlC$_2$ (Average grain size: 5 μm) | Ti$_3$AlC$_2$ (Average grain size: 50 μm) | TiCN | TiAl$_3$ | SiO$_2$ |
| Raw material of binder phae for Comparative example | m | 1 | 4 | — | — | 55 | 37 | 3 |
| | n | 40 | 20 | — | — | 38 | — | 2 |
| | o | — | — | 1 | 39 | 55 | 5 | — |
| | p | — | — | 2 | 38 | — | 57 | 3 |
| | q | — | — | 40 | 55 | — | — | — |
| | r | 2 | 38 | — | — | — | 57 | 3 |

In Table 3, the symbol "—" indicates that it is not compounded

TABLE 4

| Type | | cBN Content (% by volume) | cBN Average grain size (μm) | Material for binder phase | Heat treatment temperature after mixing (° C.) | Ratio of peak intensities by XRD [$I_{Ti2CN}/I_{Ti-Al}$] | Area rate (%) | Average aspect ratio of over lapping Ti and B elements | Composition of sintered compact (identified by XRD) |
|---|---|---|---|---|---|---|---|---|---|
| Sintered compact of comparative example | 1 | 73.7 | 2.8 | e | 1200 | —*[1] | 0.072 | 2.0 | cBN, Ti$_2$CN, TiB$_2$, TiAl$_3$, AlN (Al$_2$O$_3$ peak not found*[2]) |
| | 2 | 72.6 | 1.9 | q | 650 | 9.4 | 0.205 | 10.8 | cBN, Ti$_2$CN, TiB$_2$, TiAl$_3$, AlN (Al$_2$O$_3$ peak not found*[2]) |
| | 3 | 74.1 | 2.4 | o | 100 | 45.6 | 0.030 | 1.9 | cBN, Ti$_2$CN, TiB$_2$, TiAl$_3$, AlN (Al$_2$O$_3$ peak not found*[2]) |

TABLE 4-continued

| Type | cBN Content (% by volume) | cBN Average grain size (µm) | cBN Material for binder phase | Heat treatment temperature after mixing (° C.) | Ratio of peak intensities by XRD $[I_{Ti2CN}/I_{Ti-Al}]$ | Area rate (%) | Average aspect ratio of over lapping Ti and B elements | Composition of sintered compact (identified by XRD) |
|---|---|---|---|---|---|---|---|---|
| 4 | 73.9 | 2.6 | p | 600 | 0.6 | 0.032 | 2.6 | cBN, $Ti_2CN$, $TiB_2$, $TiAl_3$, $Al_2O_3$, AlN |
| 5 | 73.1 | 2.1 | n | 900 | 18.4 | 0.040 | 11.2 | cBN, $Ti_2CN$, $TiB_2$, $TiAl_3$, $Al_2O_3$, AlN |
| 6 | 74.4 | 2.7 | r | 600 | 0.5 | 0.020 | 2.4 | cBN, $Ti_2CN$, $TiB_2$, $TiAl_3$, $Al_2O_3$, AlN |
| 7 | 75.5 | 2.4 | o | 600 | 60.8 | 0.033 | 1.7 | cBN, $Ti_2CN$, $TiB_2$, $TiAl_3$, AlN ($Al_2O_3$ peak not found[*2]) |
| 8 | 73.9 | 2.8 | m | 600 | 14.7 | 0.014 | 1.2 | cBN, $Ti_2CN$, $TiB_2$, $TiAl_3$, $Al_2O_3$, AlN |

In Table 4, the symbol *[1] indicates that the $TiAl_3$ was not observed by XRD, and the symbol "*[2]" indicates that $Al_2O_3$ was observed by electron probe micro analyzer (EPMA).

Example tools 1 to 20 (referred to as Examples 1 to 20) and Comparative tools 1 to 8 (referred to as Comparative Examples 1 to 8) having ISO standard RNGN090300 geometry were fabricated from Inventive sintered compacts 1 to 15 and Comparative sintered compacts 1 to 5, respectively, and were each mounted on an NC lathe for the following wet cutting tests.

Cutting speed: 150 m/min
Depth of cut: 0.3 mm
Feed rate: 0.1 mm/rev
Workpiece material to be cut: granite (from Takine) Shape Φ150 mm by 200 mm L
Cutting fluid material: water-soluble cutting oil (Neocool by MORESCO Co., Ltd.)

The amount of wear of the cutting edge and the state of the cutting edge were checked after the cutting length (cutting distance) reached 800 m. Regardless of this, the cutting edge was observed every 100 m of cutting length to observe any defect and the amount of wear. If the amount of wear exceeded 2000 µm, the cutting test was stopped at that point. The results are shown in Table 5.

TABLE 5

| Type | | Amount of wear (State of edge) | Type | | Amount of wear (State of edge) |
|---|---|---|---|---|---|
| Example | 1 | 390 µm (Chipping not observed | Comparative | 1 | Not measured (Fracture)* |
| | 2 | 1870 µm (Chipping observed) | example | 2 | Not measured (Fracture)* |
| | 3 | 1920 µm (Chipping observed) | | 3 | 2450 µm (Chipping observed)* |
| | 4 | 590 µm (Chipping not observed | | 4 | 2600 µm (Chipping observed)* |
| | 5 | 610 µm (Chipping not observed | | 5 | Not measured (Fracture)* |
| | 6 | 710 µm (Chipping not observed | | 6 | 2350 µm (Chipping observed)* |
| | 7 | 370 µm (Chipping not observed | | 7 | Not measured (Fracture)* |
| | 8 | 1920 µm (Chipping observed) | | 8 | 2400 µm (Chipping observed)* |
| | 9 | 700 µm (Chipping not observed | | | |
| | 10 | 550 µm (Chipping not observed | | | |
| | 11 | 140 µm (Chipping not observed | | | |
| | 12 | 1980 µm (Chipping observed) | | | |
| | 13 | 910 µm (Chipping not observed | | | |
| | 14 | 400 µm (Chipping not observed | | | |
| | 15 | 2020 µm (Chipping observed) | | | |
| | 16 | 2230 µm (Chipping observed) | | | |
| | 17 | 450 µm (Chipping not observed | | | |
| | 18 | 810 µm (Chipping not observed | | | |
| | 19 | 470 µm (Chipping not observed | | | |
| | 20 | 1860 µm (Chipping observed) | | | |

In Table 5, the symbol "*" indicates the state at a cutting length of 100 m.

Table 5 evidentially demonstrates that all Examples show reduced amount of wear and no chipping indicating high abrasive wear resistance, and also are resistant to damage factors, such as fracture due to impacts and vibrations to destroy rocks, even use as drilling tools. In contrast, all Comparative examples experience fracture or a high amount of wear after only a short cutting length, and thus have low abrasion resistance, which results indicate that they are difficult to use as drilling tools.

The disclosed embodiments are illustrative only and not restrictive in all respects. The scope of the invention is indicated by the claims rather than the aforementioned embodiments and is intended to include all modifications within the gist and scope of the claims and equivalents.

The invention claimed is:

1. A cBN sintered compact comprising:
cubic boron nitride grains; and
a binder phase, wherein
1) the binder phase comprises;
   a Ti—Al alloy,
   $Ti_2CN$, and
   $TiB_2$,
   the Ti—Al alloy containing at least one element selected from the group consisting of Si, Mg, and Zn,
2) a ratio $I_{Ti2CN}/I_{Ti-Al}$ in XRD is 2.0 or more and 30.0 or less, where $I_{Ti2CN}$ represents the peak intensity of $Ti_2CN$ appearing at 2θ from 41.9° to 42.2° and $I_{Ti-Al}$ represents the peak intensity of the Ti-Al alloy at 2θ angle from 39.0° to 39.3°, and
3) areas where Ti and B elements overlap have an average aspect ratio of 1.7 or more and 6.5 or less and an area rate of 0.025% or more and 0.120% or less, in a mapping image of the Ti and B elements by Auger electron spectroscopy.

\* \* \* \* \*